(12) United States Patent
Dorrmann (10) Patent No.: US 8,714,958 B2
(45) Date of Patent: May 6, 2014

(54) BLOW MOULD ASSEMBLY

(75) Inventor: Bernhard Dorrmann, Woerth (DE)

(73) Assignee: Krones AG, Neutraubling (DE)

( * ) Notice: Subject to any disclaimer, the term of this patent is extended or adjusted under 35 U.S.C. 154(b) by 171 days.

(21) Appl. No.: 13/184,492

(22) Filed: Jul. 15, 2011

(65) Prior Publication Data

US 2012/0034331 A1 Feb. 9, 2012

(30) Foreign Application Priority Data

Aug. 9, 2010 (DE) .......................... 10 2010 033 803

(51) Int. Cl.
*B29C 49/42* (2006.01)
*B29C 49/48* (2006.01)

(52) U.S. Cl.
USPC ............ 425/195; 425/522; 425/529; 425/541

(58) Field of Classification Search
USPC .................................. 425/195, 522, 529, 541
See application file for complete search history.

(56) References Cited

U.S. PATENT DOCUMENTS

| 4,472,128 | A | * | 9/1984 | Ruhl .............................. 425/186 |
| 5,968,560 | A | * | 10/1999 | Briere et al. .............. 425/192 R |
| 7,258,538 | B2 | * | 8/2007 | Miller .......................... 425/182 |
| 8,333,581 | B2 | * | 12/2012 | Langlois ...................... 425/195 |
| 2007/0212442 | A1 | * | 9/2007 | Nonogaki .................... 425/541 |
| 2009/0136613 | A1 | * | 5/2009 | Linke et al. .................. 425/541 |
| 2012/0091634 | A1 | * | 4/2012 | Meinzinger et al. .......... 264/523 |

* cited by examiner

*Primary Examiner* — Robert B Davis
(74) *Attorney, Agent, or Firm* — Novak Druce Connolly Bove + Quigg LLP (57) ABSTRACT

A blow mould assembly for moulding plastic preforms into plastic containers may include a blow mould unit forming a cavity, within which the plastic preforms can be expanded into plastic containers. The blow mould unit may be of a design that includes at least two parts. The assembly further includes a blow mould holder for receiving the blow mould unit. The blow mould holder may include at least two mould holder elements for receiving parts of the blow mould unit. The assembly further includes a locking mechanism configured to arrest at least one part of the blow mould unit with respect to at least one mould holder element. The locking mechanism includes an engagement member that exerts a force, in a latched condition of the part of the blow mould unit with respect to a mould holder element, onto a section of the part of the blow mould unit. The force holds the part of the blow mould unit relative to the mould holder element. The locking mechanism has an actuating member configured to release a latching engagement between the mould holder element and the part of the blow mould unit. An orientation of the engagement member is latched in a first position of the actuating member and the orientation of the engagement member can be changed in a second position of the actuating member.

19 Claims, 7 Drawing Sheets

BLOW MOULD ASSEMBLY

CROSS-REFERENCE TO RELATED APPLICATION

This application claims the benefit of priority of German Patent Application No. 10 2010 033 803.6, filed Aug. 9, 2010, pursuant to 35 U.S.C. 119(a)-(d), the disclosure of which is incorporated herein by reference.

TECHNICAL FIELD

The present disclosure relates to a blow mould assembly for producing plastic containers.

BACKGROUND

Such blow mould assemblies have been known from the prior art for a long time. These blow mould assemblies are components of blow stations, within which plastic preforms are expanded into plastic containers. To this end, these blow mould assemblies usually include a blow mould, the internal wall of which is adapted to the contour of the container to be produced. The preforms are expanded into plastic containers using air pressure.

The blow moulds are arranged here in blow mould carriers or mother moulds in a replaceable manner. This means that once these blow moulds have worn or also when a change to other types of containers is to be carried out, these blow moulds are removed from the blow mould carriers and are replaced with other blow moulds. This replacement of blow moulds is a relatively complex procedure in the prior art. Initially, several fastening screws have to be released and subsequently claws or locking clamps have to be pivoted in order to release the blow mould. The reassembling operation of the blow mould is also relatively complex. It may occur that during reassembly, the locking clamps hamper the process of inserting the blow moulds into the mould carrier or the mother mould and/or the mould shell, which has to be carried out first.

The present disclosure is primarily described with reference to the mounting or fastening of a blow mould on a mould carrier shell, however, it is to be noted that the disclosure is also applicable to the mounting of a blow mould on a mother mould, the mounting of a mother mould on a mould carrier shell or a blow mould carrier, and also to the mounting of a mould carrier shell or mother mould on a blow mould carrier. Therefore, apart from the terms mother mould, blow mould carrier or blow mould shell, also the term blow mould holder will be used below, which can refer both to a mother mould, a blow mould shell and to a blow mould carrier. In this connection, therefore, the term blow mould holder refers to an element which at least partially receives a further element, i.e. the blow mould holder is, for example, an element which receives a further element.

Further, apart from the terms blow mould, mother mould and mould carrier shell, also the term blow mould unit will be used, which can refer to both the blow mould and the mother mould as well as to the blow mould shell, each of which forms a cavity that is used for the expansion of the plastic preform. In the case of the mother mould or the blow mould shell, the cavity is used for receiving a blow mould and is therefore indirectly used for expanding the plastic preform. This means that the blow mould unit is, for example, a received element, more specifically an element that is disposed radially within the blow mould holder and is received by this blow mould holder.

DE 10 2005 035 233 A1 describes a device for retaining blow mould segments. Here, a latching member is provided which is formed both for providing a positive retention and also for providing a frictional retention of the blow mould segment. More specifically, a lever is provided by means of which a latching element can be displaced in order to release the latching of a blow mould. However, this device, too, may under certain circumstances hamper the insertion of blow mould segments.

U.S. Pat. No. 6,615,472 B2 describes a quick-change blow mould assembly. This assembly, too, comprises a carrier plate and a blow mould half that can be fixed to the carrier plate.

It may therefore be desirable to simplify the assembly and disassembly of such blow mould units relative to the blow mould holders.

SUMMARY

A blow mould assembly according to the disclosure for moulding plastic preforms into plastic containers includes a blow mould unit (for example, one that is received by a further element), which forms a cavity within which the plastic preforms are formed into plastic containers or which is used for expanding the plastic preforms, said blow mould unit being of a design that consists of at least two parts.

Further, the assembly includes a blow mould holder for receiving the blow mould unit, said blow mould holder having at least two mould holder elements for receiving parts of the blow mould. Further, a locking mechanism is provided in order to arrest at least one part of the blow mould unit relative to at least one mould holder element. This locking mechanism includes an engagement member which, in a latched (or arrested) condition of a part of the blow mould unit relative to a mould holder element, exerts a force on a section of the part of the blow mould unit so as to hold the part of the blow mould unit relative to the mould holder element.

The locking mechanism includes an actuating member in order to release a latching engagement between the mould holder element and the blow mould unit or said part of the blow mould unit.

According to the disclosure, an orientation or position of the engagement member is latched in a first position of the actuating member. Further, in a second position of the actuating member, the orientation of the engagement member can be changed.

This means, for example, that in one position of the actuating member, in which the blow mould is latched onto the carrier, also the engagement member is fixed with regard to its function or position. In some aspects, the orientation of the engagement member is here fixed as a result of the actuating member exerting a force. In the second position of the actuating member, for example, in an opening position, the orientation of the engagement member can be changed, which means for example, that the engagement member itself can be moved here. In some aspects, in the second position of the actuating member, the engagement member can for example be rotated so that the blow mould unit can be removed from the mould holder element. In some aspects, the engagement member and the actuating member are implemented as separate components. In some aspects, it is also conceivable that the engagement member and the actuating member can be moved independently from each other.

In some aspects, in the second position of the actuating member, the blow mould unit can be released from the mould holder element. Thus, it is possible that the blow mould unit can be withdrawn, for example, by rotating it, from the mould holder element in said second position of the actuating member.

In an exemplary embodiment, the engagement member is arranged between the actuating member or a part of the actuating member and the blow mould unit. In some aspects, the engagement member can be pushed against the blow mould unit by the actuating member, in order to arrest said blow mould unit relative to the mould carrier. Thus, the actuating member can have an eccentric shape with regard to its pivot axis, so that on account of this eccentric shape, a locking or unlocking action can be carried out by way of a movement of the actuating member.

In some aspects, the engagement member and the actuating member are further formed as two different parts which are, however, in some aspects arranged directly next to each other.

In an exemplary embodiment, the engagement member can be rotated with respect to a predefined pivot axis. In an exemplary embodiment, the engagement member can be pivoted in the second position of the actuating member together with the latter. In this way, the disassembly process can be simplified since the actuating member can also be used for pivoting the engagement member away.

In an exemplary embodiment, the actuating member can be pivoted about a predefined pivot axis. The actuating member can here be implemented for example as a lever element that can be pivoted about a predefined pivot axis. In some aspects, the direction of the pivot axis about which the actuating member can be pivoted, deviates from the pivot axis about which the engagement member can be pivoted. However, it would also be possible to provide for at least components of the actuating member to be pivotable about two pivot axes, and in an open condition of the actuating member, the latter could also be pivotable together with the engagement member.

In some aspects, the pivot axis of the actuating member, in respect of which the actuating member is pivoted for opening or closing the blow mould assembly, is pivoted geometrically vertically to the pivot axis about which the engagement member is pivoted.

In an exemplary embodiment, the actuating member includes (for example, in respect of a pivot axis of the actuating member) an eccentrically formed contact section. In some aspects, this contact section acts here preferably at least indirectly and in some aspects preferably directly on the engagement member, so that by pivoting the actuating member about said axis, the engagement member can be latched or released. This will be explained in more detail with reference to the figures.

For example, the blow mould unit is a blow mould which directly forms the cavity for expanding the preform. In some aspects, the blow mould holder is a blow mould shell that directly receives the blow mould. For example, a movement of the engagement member and in some aspects also of the actuating member is a pivot or rotary movement about the predefined axis, and in some aspects it is exclusively such a pivoting or rotary movement with no additional displacement movement being provided.

It is possible here for the engagement member to be pivotable in a plane which is parallel to a parting plane that separates the two blow mould halves or also the mould holder halves from each other. However, it would also be possible for the engagement member to be pivotable about an axis that extends parallel to a longitudinal direction of the containers to be moulded.

In an exemplary embodiment, a maximum angle of rotation of the engagement member is less than 360°, in some aspects less than 180°, in some aspects less than 100°, and in some aspects less than 90°. By this embodiment it can be achieved that the engagement member is rotatable only about accurately defined angles, and therefore any interferences by this engagement member during the reassembly of further blow mould segments can be avoided. Further, very accurately defined rotary positions for the engagement members can be achieved in this way. In some aspects, in any case no complete rotation of the engagement member is possible.

In an exemplary embodiment, the engagement element is disposed on a carrier and this carrier is disposed on the blow mould holder. In this connection it is possible for the carrier to be a strip-like member that is mounted to the blow mould holder for example by means of screw connections in a fixed but detachable manner. On this carrier in turn said engagement members are rotatably mounted.

In an exemplary embodiment, the locking mechanism has at least two engagement members which are arranged one after the other in a longitudinal direction of the blow mould unit. This means that the blow mould unit is stabilised or latched along its longitudinal direction in at least two positions relative to the blow mould holder.

In an exemplary embodiment, the locking mechanism has at least two engagement members and the blow mould unit is at least partially disposed between these engagement members. This means that the blow mould unit is latched on either side with regard to the cavity or with regard to the container to be expanded in relation to the blow mould holder respectively by rotatable engagement members. However, it would also be possible for the blow mould unit for example to be hooked in on one side without any (rotatable) engagement members and for rotatable engagement members to be provided only on the other side.

In some aspects, the blow mould unit includes recesses or notches, which are engaged by the engagement members.

In an exemplary embodiment, at least one engagement member engages in at least one rotary position. In some aspects, the engagement member engages in exactly two rotary positions, and these are an open position and a closed position. In this way, the individual engagement means can respectively be rotated into the opening position during disassembly of the blow mould unit so as to engage in this position. When a further blow mould unit is installed, these engagement members will therefore not hamper the installation process. Further, the latching positions of the engagement members are accurately defined in this way.

In an exemplary embodiment, the engagement member is rotatably supported by means of at least two ball bodies. For example, three such ball bodies are provided, which are disposed between the engagement member and the blow mould holder or between the engagement member and the carrier. By means of these three ball bodies, the engagement member is supported in a defined manner. Instead of ball bodies, also cylindrical or conical bodies may be provided.

Further, said ball bodies are in some aspects arranged in tracks. In this way, a very simply defined rotation of the engagement member is achieved. Moreover, also the two latching positions of the engagement member relative to the blow mould holder or relative to the above-mentioned carrier can be defined via said tracks.

In an exemplary embodiment, the engagement member has at least one rounded external surface. In some aspects, this rounded external surface is provided on one end of the engagement member which is opposite an engagement area by which the engagement member comes into contact with the blow mould unit in a latched condition. This rounded external surface allows a (especially limited) rotary movement of the engagement member relative to the blow mould holder.

In an exemplary embodiment, the blow mould assembly includes spring means in order to pretension the engagement member relative to the carrier or to the blow mould carrier. In this respect it is for example possible for this spring element to be disposed below said carrier and to pull the engagement member towards the carrier. In this connection, for example, also the above-mentioned ball bodies are clamped by said spring element.

In an exemplary embodiment, the blow mould assembly includes a safety mechanism that prevents the blow mould unit from closing in case the blow form unit is not correctly latched. For example, it would be possible, after installing a blow mould, to forget to re-lock individual safety elements. The safety mechanism prevents that the blow mould unit can be completely closed, so that the user will notice the misalignment of a safety element and can correct it.

In an exemplary embodiment, the blow mould assembly has at least two actuating members and each of these actuating members in turn has a protrusion and a recess, so that in a closed condition of the blow mould unit at least one protrusion of one actuating member engages in the recess of the other actuating member. In some aspects, however, the protrusions and the recesses are arranged in such a way that such a mutual engagement will not occur unless both safety devices are correctly tightened and otherwise for example the two protrusions are in contact with each other, so that the blow mould unit is prevented from closing.

In a further embodiment, the blow mould assembly includes at least one liquid line with at least one feed connection for feeding liquid and the blow mould holder has at least one supply connection for supplying the liquid line with liquid. The feed connection can be connected to the supply connection via a locking process for latching the blow mould unit and the blow mould holder together.

In this embodiment use is made of the fact that, as a result of latching the blow mould unit together with the blow mould holder, large forces can be applied between the blow mould holder and the blow mould unit. These forces can be used to generate liquid connections between these two elements. These liquid connections are in some aspects used for controlling the temperature of the blow mould unit. In this way, an additional operation for connecting liquid lines to the blow mould may be dispensed with.

In some aspects, the supply connection and the feed connection are connected to each other in a sealing or liquid-tight manner. Particularly in some aspects compressible sealing surfaces are provided for this purpose, and in some aspects at least one of these sealing surfaces is formed by an elastic material such as, for example, an O-ring seal.

The present disclosure is further directed to a stretch blow moulding machine having a plurality of blow stations, in which blow stations plastic preforms can be moulded into plastic containers. According to the disclosure, at least one of these blow stations includes a blow mould assembly of the type described above.

Further advantages and embodiments will become evident from the attached drawings.

BRIEF DESCRIPTION OF THE DRAWINGS

In the drawings:

FIG. 7 shows a bottom view of the locking assembly from FIG. 4; and; and

DETAILED DESCRIPTION

FIGS. 1a-1f show an embodiment of a blow mould assembly according to DE 10 2009 019 845.8 which has not yet been published.

The content of this patent application is herewith included in its entirety by reference as part of the subject matter of the present application.

In the blow mould assembly 1, each blow mould shell 2a can be replaced without the use of an additional tool by means of an eccentric quick-action clamping element 316. FIG. 1b shows a further perspective view of this blow mould assembly 1. The eccentric quick-action clamping element 316 is flush-mounted in a recess 7 of the blow mould 2 or of the blow mould half 2a, so that a second blow mould half 2a can be placed flush against it and the entire blow mould assembly 1 can be closed.

Figure 1:
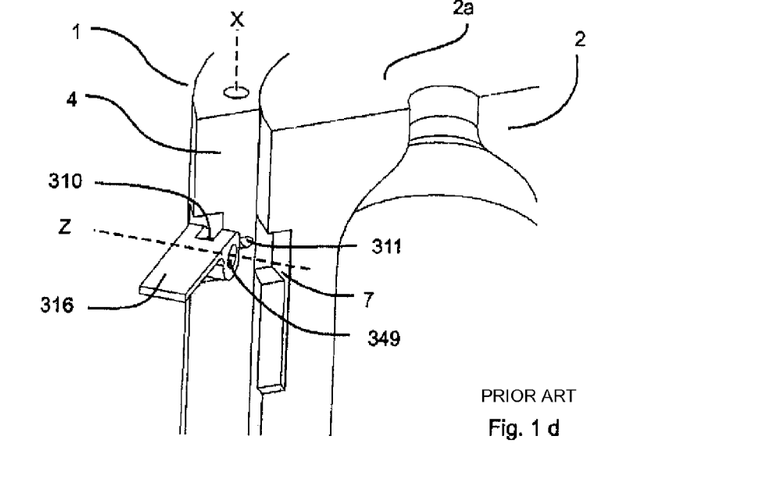
FIGS. 1a-1f show an embodiment of a blow mould assembly according to the prior art.
Figure 1A:
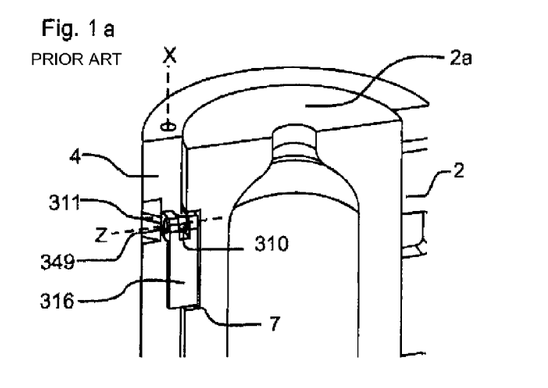
Figure 1B:
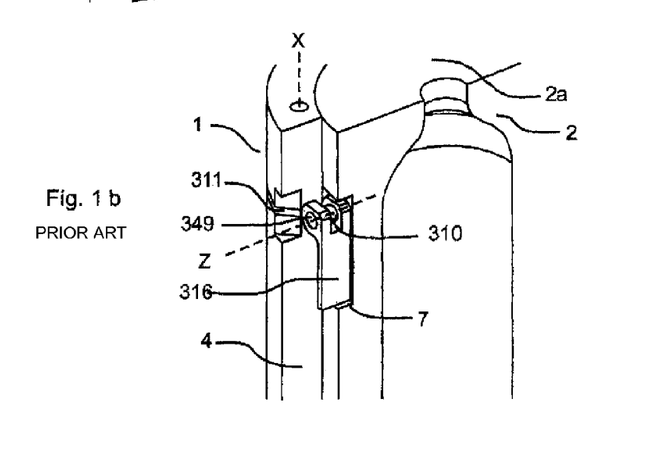
Figure 1C:
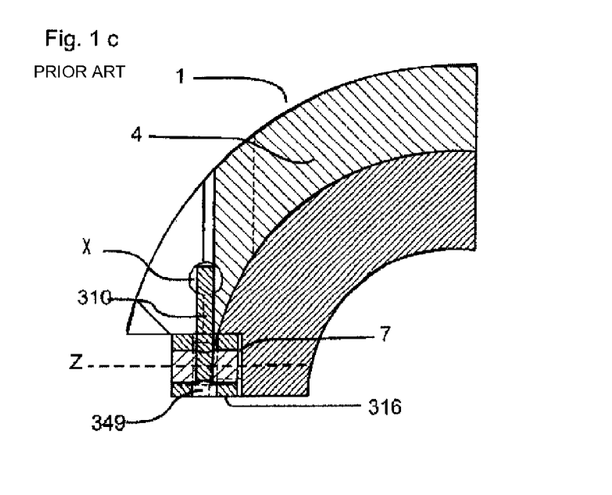

FIG. 1c shows that for mechanically latching the blow mould halves 2a in relation to the blow mould shell 4, the eccentric quick-action clamping element 316 is provided with a pin 349 and a tie rod 310 pivotally connected to an axle or a shaft X of the blow mould shell 4.

The eccentric quick-action clamping element 316 is designed to be movable about the axis Z and can be folded up about the axis Z for disassembling or releasing the blow mould from a vertical closing position to a horizontal opening position (FIG. 1d). To ensure that the blow mould can be released for replacement, the eccentric quick-action clamping element 316 can, as shown in FIG. 1e, be pivoted about an axis X. To this end, the blow mould half 2a is provided with a horizontal milling groove 311. FIG. 1f shows, in a horizontal section through the milling groove 311, the mounting of the tie rod 310 that is connected by the pin 349 to the axis Z of the eccentric quick-action clamping element 316 as well as to the axis X in the blow mould shell 4.

Figure 2:
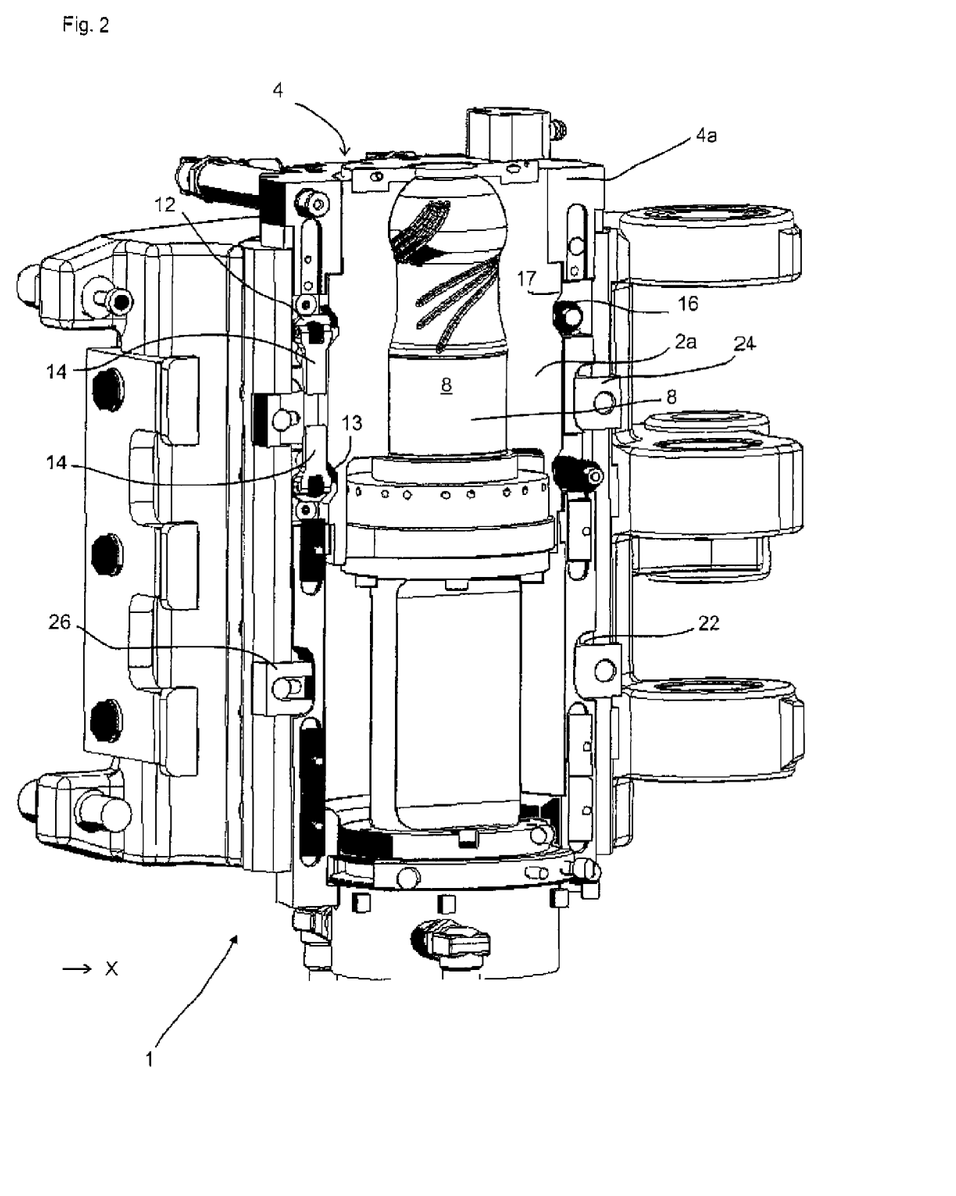
FIG. 2 shows a view of part of an exemplary blow mould assembly according to the disclosure.

FIG. 2 shows a blow mould assembly 1 according to the disclosure. Here, a mould holder element 4a is shown which is, together with a further mould holder element, part of a mould holder 4. Here, a part 2a of a blow mould unit is shown on this mould holder element 4a. In the situation shown in FIG. 2, the blow mould part 2a is disposed on the mould holder element 4a or is arrested relative to the latter. Reference numeral 16 relates to engagement members which are here fixedly mounted to the mould holder element 4a and engage in a corresponding recess 17 provided in the blow mould part 2a.

On the inside, the blow mould element 2a forms a cavity 8, within which containers can be blow moulded.

Reference numeral 26 relates to a further retaining member for retaining the blow mould holder 4 on a carrier. In doing so, this engagement member 26 engages in a recess 22 of the blow mould holder 4.

Reference numeral 14 relates to an actuating member which can here be outwardly folded up in order to separate the blow mould part 2a from a blow mould holder element 4a. Reference numeral 12 identifies an engagement member which can here engage in a corresponding recess 13 that is disposed in the blow mould element 2a. In the closed condition, the two actuating members (with respect to their pivot axis) face towards each other, as a result of which space savings for the entire assembly may be achieved. Apart from that, the user can release both of the actuating members or their levers at the same time for unlocking. However, in principle it would also be conceivable for both actuating members to be disposed facing away from each other, i.e. to provide the actuating members 14 shown in FIG. 2 rotated by 180° (not shown).

Figure 3:
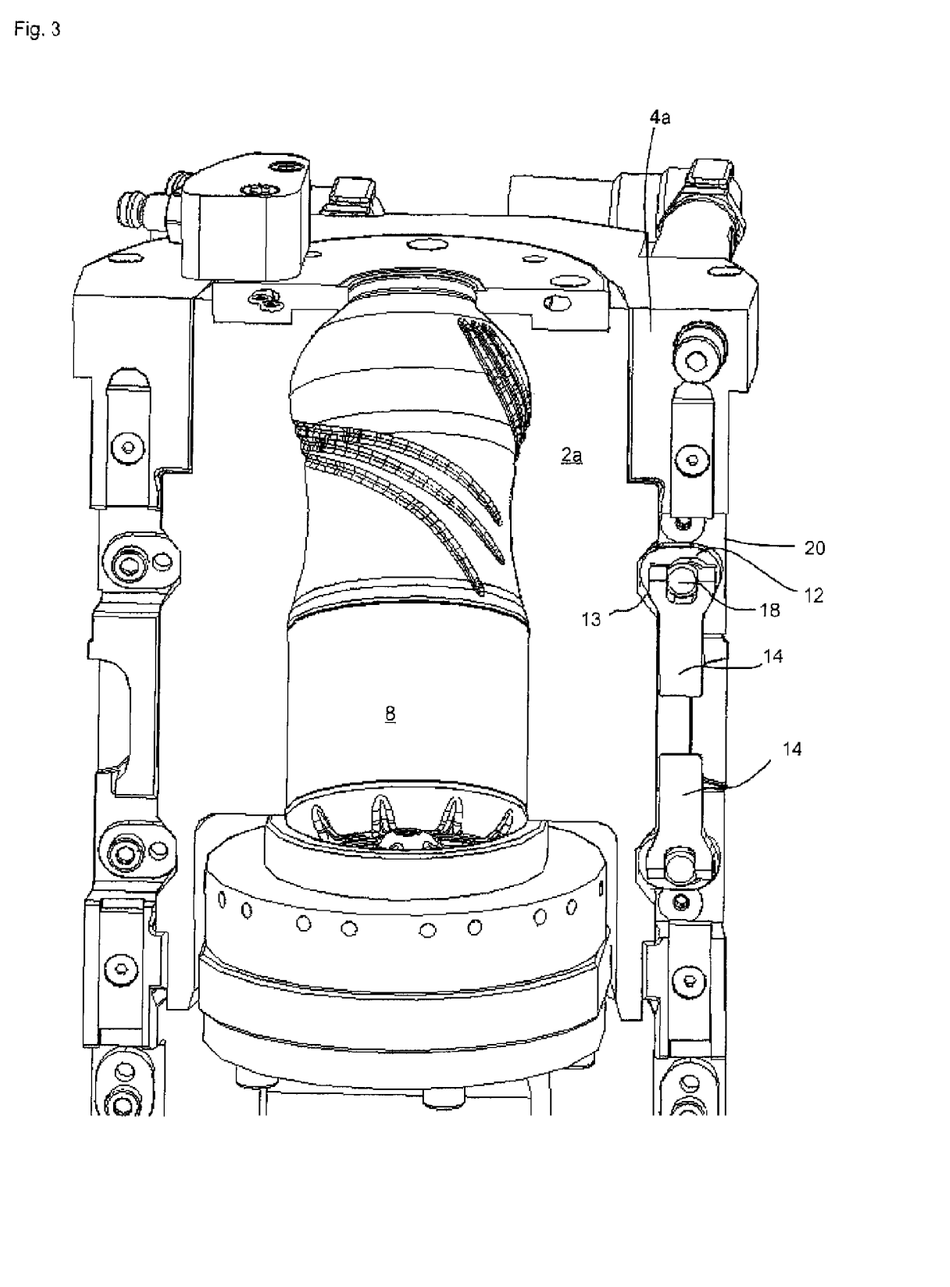
FIG. 3 shows a detailed view of the blow mould assembly shown in FIG. 2.

FIG. 3 shows a partial view of the assembly shown in FIG. 2. What can be seen here again is the recess 13 which is engaged by the engagement member 12. Both the engagement member and the actuating member 14 are here disposed on a carrier 20, and this carrier 20 is fixedly mounted to the mould holder element 4a.

Figure 4:
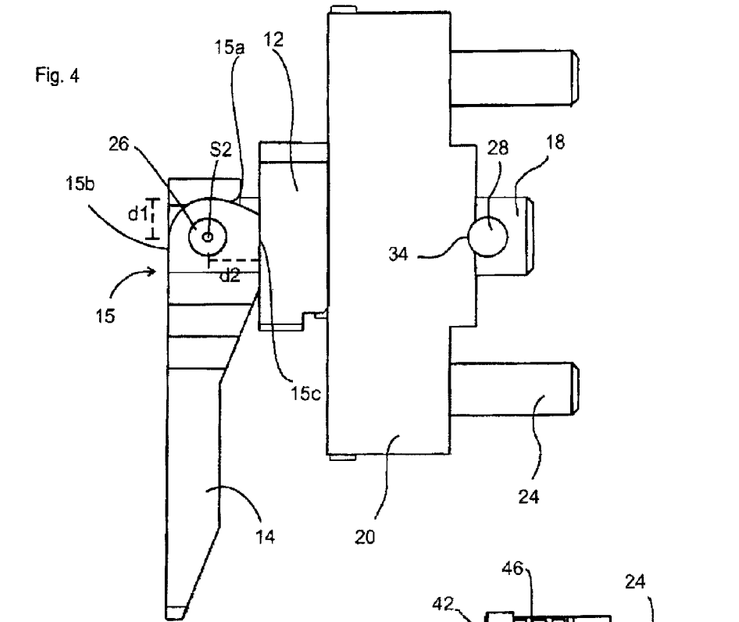
FIG. 4 shows a lateral view of locking means for the blow mould assembly from FIG. 3.

By way of illustration, FIG. 4 shows a locking member according to the disclosure. It can be seen that the actuating member 14 is here implemented as a lever that is here disposed to be pivotable in relation to a pivot axis S2. To this end, a pivot pin 26 is disposed on a tie rod 18. It can be seen that the actuating member 14 has an eccentrically formed pivot portion 15 (i.e. the distance d1 between the pivot axis S2 and the external circumference of the pivot portion that acts in a closed condition of the actuating lever, differs from the distance d2 between the pivot axis S2 and the external circumference of the pivot portion that acts in an open condition of the actuating member), so that by pivoting the actuating member 14 about the axis X, here for example by 90° in a clockwise direction, the engagement member can be released.

It can also be seen that the external circumference of the pivot portion 15 has a curved section 15a as well as two straight sections 15b, 15c, and these straight sections 15b, 15c merge, for example, via a bend, into the curved section 15a. By means of this design it can be achieved that in a released condition, the actuating member 14 is pushed by the force of the spring means 46 in such a way that it extends in the direction of the pulling means 18, as a result of which the assembly and disassembly of the blow mould are facilitated even further.

Reference numeral 20 in turn identifies a carrier on which for example the actuating member is disposed. Reference numeral 28 identifies an engagement pin which is at one end disposed on the pulling means 18 and on the other end engages in the recess 34. The carrier 20 is disposed, as mentioned above, on the mould holder element 4a by means of guiding pins 24.

Figure 5:
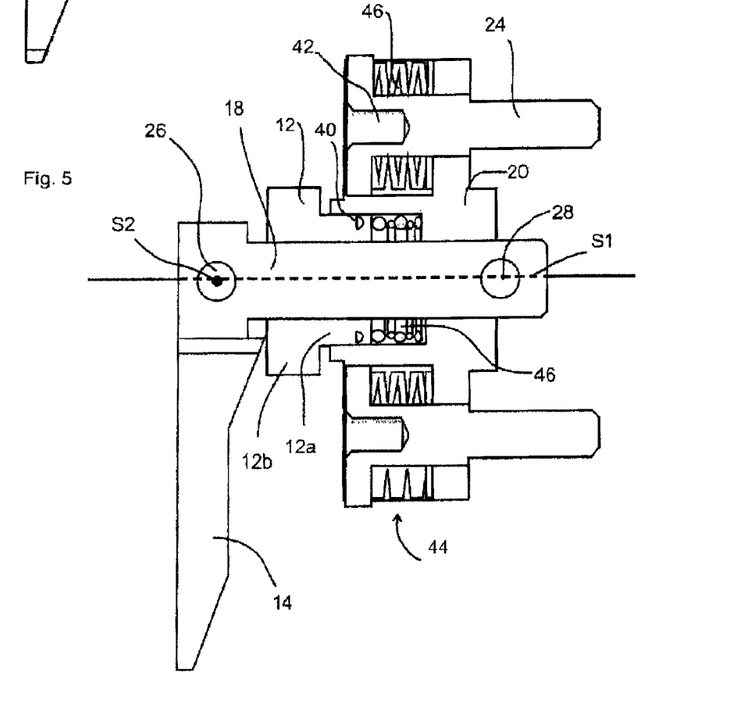
FIG. 5 shows a sectional view of the locking assembly shown in FIG. 4.

FIG. 5 shows a sectional view of the locking device shown in FIG. 4. The carrier 20 or the receptacle 20 is fastened to the mould carrier or the mother mould by means of guiding pins 24. The guiding pins 24 (which may also be implemented as threaded bolts) allow a horizontal movement of the receptacle or the carrier against the suspension means or disc spring packages 44.

In a closed or latched condition of the blow mould (the blow mould is here fixedly retained on the carrier), the actuating member 14 or the lever is in a vertical orientation, the clamping claw, i.e. the engagement member 12, rests on top of the blow mould and the carrier 20 is lifted off from the support surface and applies, by means of the suspension means 44 via the engagement member 12, a force onto the blow mould which fixedly retains the latter in the mould carrier or the mother mould. Any geometric terms used here, such as horizontal movement or vertical position, are respectively to be understood with reference to the installation situation of the blow mould, such as shown for example in FIG. 2.

In order to open the quick release closure for replacing the blow moulds, the actuating member 14 or the lever is rotated by 90° into the horizontal position. During this motion, the system is relaxed as a result of the above-described eccentric shape of the lever 14, the carrier 20 rests again on the support surface in the mould carrier and the engagement member lifts off from the blow mould 2 or the blow mould part 2a. This movement of the engagement member 12 away from the blow mould is supported by a spring element 46.

In the open condition, the actuating member 14 or the lever can then be rotated by 90° (in relation to the pivot axis S1). As a result, also the engagement member 12 is pivoted away by virtue of a positive connection between the engagement member 12 and the pulling means 18. The further pivot pin 28 engages in the recess or groove 34 (cf. FIG. 7). This position is in turn maintained by the spring element 46, so that during replacement of the blow mould, no unintended movements of the engagement member 12, which could hamper the removal or insertion of the blow mould, can occur.

For closing, the actuating member 14 and thus also the engagement means are rotated by 90° with respect to the axis S1 and the system is clamped by pivoting the actuating member 14 about the axis S2 into the vertical position.

It can be seen in FIG. 5 that the engagement member 12 has a base body 12a that is disposed in a corresponding recess 40 of the carrier 20. Reference numeral 46 relates to a spring element that pretensions the engagement body 12 here upwards, i.e. in the direction of the engagement member 14. Upon releasing the actuating member, which means here after pivoting it by 90° in the clockwise direction, the engagement member 12 can move upwards by virtue of the spring force of the spring 46 and can in this way release the blow mould. It would be possible here for the base body 12a to have a circular cross section and for the recess 40 also to have a circular cross section. However, it would also be possible for the base body 12a to have a cross section that deviates from a circular cross section and not to be rotatable with respect to the axis S1 until the base body 12a has completely exited the recess 40. As mentioned above, it would also be possible to retain the carrier 20 relative to the mould carrier element 20 by means of the spring means 46 in a spring-loaded manner.

Figure 6:
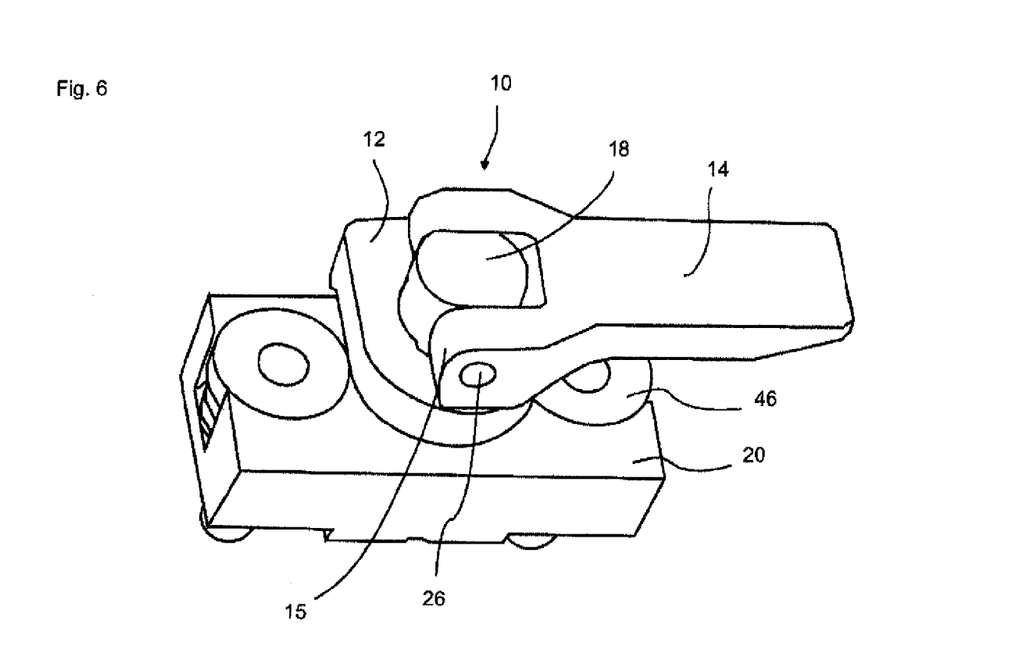
FIG. 6 shows a perspective view of the locking assembly from FIG. 4.

FIG. 6 shows a further perspective view of the locking mechanism 10. Here, too, the actuating lever that is disposed to be pivotable in relation to the tie rod 18 can be seen. On the outside, again, the screw connections 46 can be seen, by means of which the carrier 20 can be disposed on the mould carrier element.

Figure 7:
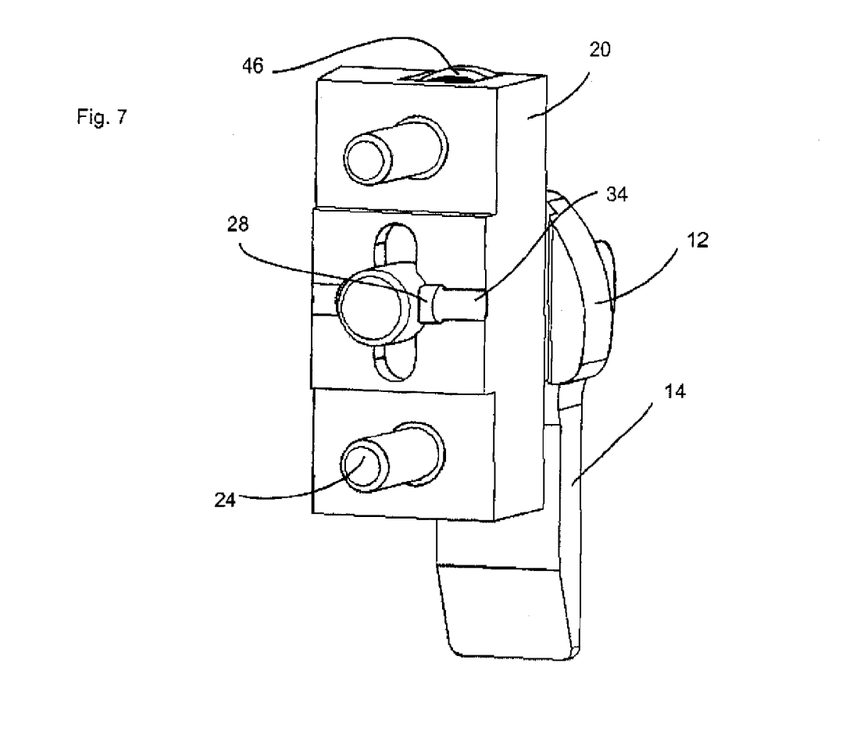

FIG. 7 shows a further perspective view of the device, and here, too, the pin 28 can be seen which engages (also in a closed condition of the blow mould) in the recess 34. In a released condition of the actuating member 14, the pin 28 is released from its engagement with the recess 34, and in this way it becomes possible for the actuating member to be pivoted with respect to the above-mentioned axis X, and at the same time the engagement member 12 is pivoted here. By means of the spring 46 shown in FIG. 5, the engagement member 12 can be pushed against the actuating member 14 at all times, so that a common rotary movement between these two members can take place.

Figure 8A:
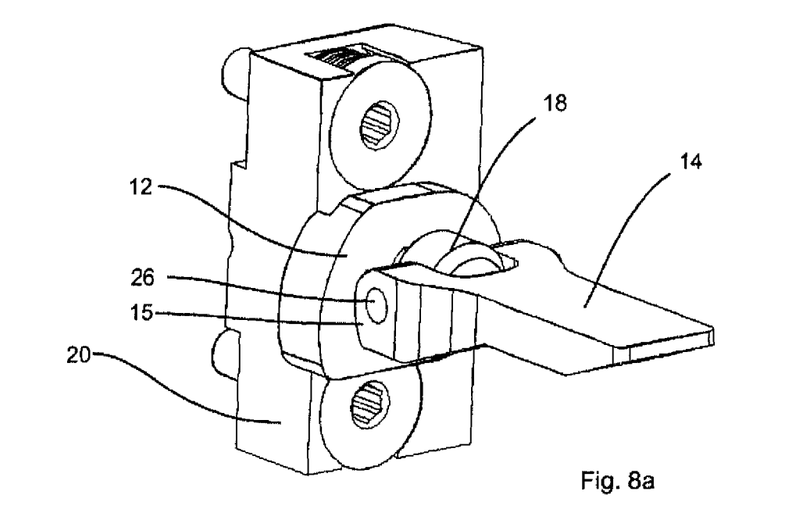
FIGS. 8a-b show two further views of the locking assembly.
Figure 8B:
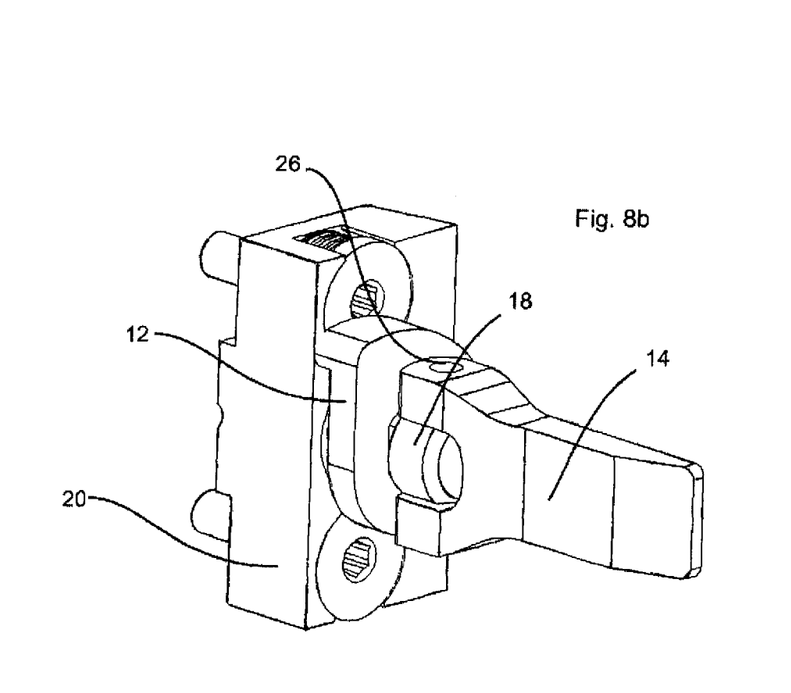

FIGS. 8a and 8b show a further representation of the locking arrangement, and here the actuating member 14 is arranged in an opened position. In this position of the actuating member 14, the engagement member 12 can be rotated or pivoted. In FIG. 8a, the engagement member is in an orientation in which it engages in the blow mould, and in FIG. 8b it is in an orientation in which the blow mould is released.

The applicant reserves the right to claim all of the features disclosed in the application documents as being essential to the invention in as far as they are novel over the prior art either individually or in combination.

It will be apparent to those skilled in the art that various modifications and variations can be made to the blow mould assembly of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A blow mould assembly for moulding plastic preforms into plastic containers, comprising:
   a blow mould unit forming a cavity, within which the plastic preforms can be expanded into plastic containers, said blow mould unit being of a design that comprises at least two parts;
   a blow mould holder for receiving the blow mould unit, said blow mould holder including at least two mould holder elements for receiving said at least two parts of the blow mould unit; and
   a locking mechanism configured to arrest at least one of said parts of the blow mould unit with respect to at least one of said mould holder elements, the locking mechanism including an engagement member that exerts a force, in a latched condition of said arrested part of the blow mould unit with respect to said mould holder element, onto a section of said arrested part of the blow mould unit, said force being for holding the arrested part of the blow mould unit relative to the mould holder element, said locking mechanism having an actuating member configured to release a latching engagement between the mould holder element and the part of the blow mould unit,
   wherein an orientation of the engagement member is latched in a first position of the actuating member, and wherein the orientation of the engagement member can be changed in a second position of the actuating member, and wherein the engagement member is rotatable with respect to a predetermined pivot axis.

2. The blow mould assembly as claimed in claim 1, wherein in the second position of the actuating member, the blow mould unit can be detached from the mould holder element.

3. The blow mould assembly as claimed in claim 1, wherein the engagement member is disposed between the actuating member and the blow mould unit.

4. The blow mould assembly as claimed in claim 1, wherein the engagement member and the actuating member are two separate components.

5. The blow mould assembly as claimed in claim 1, wherein the engagement member is pivotable in the second position of the actuating member together with the actuating member.

6. The blow mould assembly as claimed in claim 1, wherein the actuating member is pivotable about a predefined pivot axis.

7. The blow mould assembly as claimed in claim 1, wherein the engagement member is disposed on a carrier, and the carrier is disposed on the blow mould holder.

8. The blow mould assembly as claimed in claim 1, wherein the actuating member includes an eccentrically formed contact section.

9. The blow mould assembly as claimed in claim 1, further comprising spring means configured to pretension the engagement member relative to the carrier.

10. A stretch blow moulding machine comprising:
    a plurality of blow stations, in which plastic preforms can be moulded into plastic containers, at least one of said blow stations includes a blow mould assembly as recited in claim 1.

11. A blow mould assembly for moulding plastic preforms into plastic containers, comprising:
    a blow mould unit forming a cavity, within which the plastic preforms can be expanded into plastic containers, said blow mould unit being of a design that comprises at least two parts;
    a blow mould holder for receiving the blow mould unit, said blow mould holder including at least two mould holder elements for receiving said at least two parts of the blow mould unit; and
    a locking mechanism configured to arrest at least one of said parts of the blow mould unit with respect to at least one of said mould holder elements, the locking mechanism including an engagement member that exerts a force, in a latched condition of said arrested part of the blow mould unit with respect to said mould holder element, onto a section of said arrested part of the blow mould unit, said force being for holding the arrested part of the blow mould unit relative to the mould holder element, said locking mechanism having an actuating member configured to release a latching engagement between the mould holder element and the part of the blow mould unit,
    wherein an orientation of the engagement member is latched in a first position of the actuating member, and wherein the orientation of the engagement member can be changed in a second position of the actuating member, and wherein the engagement member is pivotable together with the actuating member in the second position of the actuating member.

12. The blow mould assembly as claimed in claim 11, wherein in the second position of the actuating member, the blow mould unit can be detached from the mould holder element.

13. The blow mould assembly as claimed in claim 11, wherein the engagement member is disposed between the actuating member and the blow mould unit.

14. The blow mould assembly as claimed in claim 11, wherein the engagement member and the actuating member are two separate components.

15. The blow mould assembly as claimed in claim 11, wherein the actuating member is pivotable about a predefined pivot axis.

16. The blow mould assembly as claimed in claim 11, wherein the engagement member is disposed on a carrier, and the carrier is disposed on the blow mould holder.

17. The blow mould assembly as claimed in claim 11, wherein the actuating member includes an eccentrically formed contact section.

18. The blow mould assembly as claimed in claim 11, further comprising spring means configured to pretension the engagement member relative to the carrier.

19. A stretch blow moulding machine comprising:
 a plurality of blow stations, in which plastic preforms can be moulded into plastic containers, at least one of said blow stations including a blow mould assembly as recited in claim 11.

* * * * *